(12) United States Patent
Devisme et al.

(10) Patent No.: US 9,045,577 B2
(45) Date of Patent: Jun. 2, 2015

(54) PRODUCTION OF GRAFTED POLYETHYLENE FROM RENEWABLE MATERIALS, THE OBTAINED POLYETHYLENE AND USES THEREOF

(75) Inventors: Samuel Devisme, Rouen (FR); Fabrice Chopinez, Bala Cynwyd, PA (US); Jean-Laurent Pradel, Boisney (FR); Guillaume Le, Colombelles (FR); Thomas Roussel, Lyons (FR)

(73) Assignee: ARKEMA FRANCE, Colombes (FR)

( * ) Notice: Subject to any disclaimer, the term of this patent is extended or adjusted under 35 U.S.C. 154(b) by 0 days.

(21) Appl. No.: 13/055,857

(22) PCT Filed: Jul. 27, 2009

(86) PCT No.: PCT/FR2009/051508
§ 371 (c)(1),
(2), (4) Date: Mar. 11, 2011

(87) PCT Pub. No.: WO2010/012946
PCT Pub. Date: Feb. 4, 2010

(65) Prior Publication Data
US 2011/0152454 A1    Jun. 23, 2011

(30) Foreign Application Priority Data
Jul. 29, 2008  (FR) ...................................... 08 55199

(51) Int. Cl.
| | |
|---|---|
| *C08F 8/46* | (2006.01) |
| *C08F 255/02* | (2006.01) |
| *C08F 10/02* | (2006.01) |
| *C08F 110/02* | (2006.01) |
| *B32B 27/32* | (2006.01) |
| *C08F 210/16* | (2006.01) |
| *C08L 51/06* | (2006.01) |

(52) U.S. Cl.
CPC ............... *C08F 255/02* (2013.01); *C08F 10/02* (2013.01); *C08F 8/46* (2013.01); *C08F 110/02* (2013.01); *B32B 27/32* (2013.01); *C08F 210/16* (2013.01); *C08L 51/06* (2013.01)

(58) Field of Classification Search
CPC ..... B32B 27/32; B32B 27/327; C08F 255/02; C08F 8/46; C08F 10/02; C08F 110/02; C08F 210/02; C08F 210/16; C08L 51/06
USPC ........... 525/53, 285, 333.7, 386, 383; 526/75, 526/77; 428/500, 515, 516
See application file for complete search history.

(56) References Cited

U.S. PATENT DOCUMENTS

| | | | |
|---|---|---|---|
| 4,232,179 A * | 11/1980 | Valladares Barrocas et al. ............ | 585/640 |
| 4,670,620 A | 6/1987 | Jacobs et al. | |
| 4,950,541 A * | 8/1990 | Tabor et al. ................... | 428/373 |
| 6,221,985 B1* | 4/2001 | Gao et al. ...................... | 526/127 |
| 6,451,919 B1* | 9/2002 | Aglietto et al. ............... | 525/285 |
| 6,476,171 B1* | 11/2002 | Lue et al. ..................... | 526/348 |
| 7,521,497 B2 | 4/2009 | Yoshimi et al. | |
| 2002/0137959 A1* | 9/2002 | Rix ................ | 556/11 |
| 2004/0059167 A1* | 3/2004 | Clark et al. ................... | 585/446 |
| 2004/0214968 A1* | 10/2004 | Berhalter et al. .............. | 526/69 |
| 2006/0272501 A1* | 12/2006 | Plee ................ | 95/141 |
| 2007/0054142 A1* | 3/2007 | Lee et al. ..................... | 428/522 |
| 2007/0219521 A1 | 9/2007 | Hird et al. | |
| 2008/0178768 A1* | 7/2008 | Breese ......................... | 106/285 |
| 2008/0300370 A1* | 12/2008 | Lynch et al. .................. | 526/65 |
| 2009/0029080 A1* | 1/2009 | Visioli et al. ................. | 428/34.8 |
| 2010/0069691 A1 | 3/2010 | Morschbacker | |

FOREIGN PATENT DOCUMENTS

| | | |
|---|---|---|
| EP | 0 802 207 | 10/1997 |
| EP | 1 136 536 | 9/2001 |
| EP | 1 400 566 | 3/2004 |
| WO | WO 2008/06727 A2 * | 6/2008 |
| WO | WO 2010/007327 | 1/2010 |

OTHER PUBLICATIONS

Mathesontrigas, Product data sheet for ethylene, http://www.mathesongas.com/pdfs/products/Ethylene-Pure-Gas.pdf, date unknown.*

Sinopec Shanghai Petrochemical, Polymer Grade Ethylene data sheet, http://www.spc.com.cn/enspc/spc/pslook.php?Did=70&Cid=54&Dlev=2, 2005.*

Morschbacker, A., J. Macromol. Sci., Part C: Polymer Reviews 49 (2009) 79-84.*

* cited by examiner

*Primary Examiner* — Roberto Rabago
(74) *Attorney, Agent, or Firm* — Buchanan Ingersoll & Rooney P.C.

(57) ABSTRACT

The invention relates to a method for production of grafted polyethylene comprising the following steps: a) fermentation of primary renewable material with optional purification to give at least one alcohol chosen from ethanol or a mixture of alcohols comprising ethanol; b) dehydration of the alcohol obtained to give in a first reactor at least one alkene selected from ethylene and mixtures of alkenes containing ethylene and optional purification of the alkene to give ethylene; c) polymerization, in a second reactor, of the ethylene to give polyethylene; d) isolation of the polyethylene obtained in step c); e) grafting the polyethylene with at least one grafting monomer selected from the unsaturated carboxylic acids or theifunctional derivatives thereof, the unsaturated dicarboxylic acids having 4-10 carbon atoms and the functional derivatives thereof being $C_1$-$C_8$ alkyl esters or glycidyl ester derivatives of the unsaturated carboxylic acids and the metal salts of the unsaturated carboxylic acids. The invention further relates to the grafted polyethylene obtained by said method, the copolymers and compositions comprising said polyethylene and the use of said polyethylene.

15 Claims, 1 Drawing Sheet

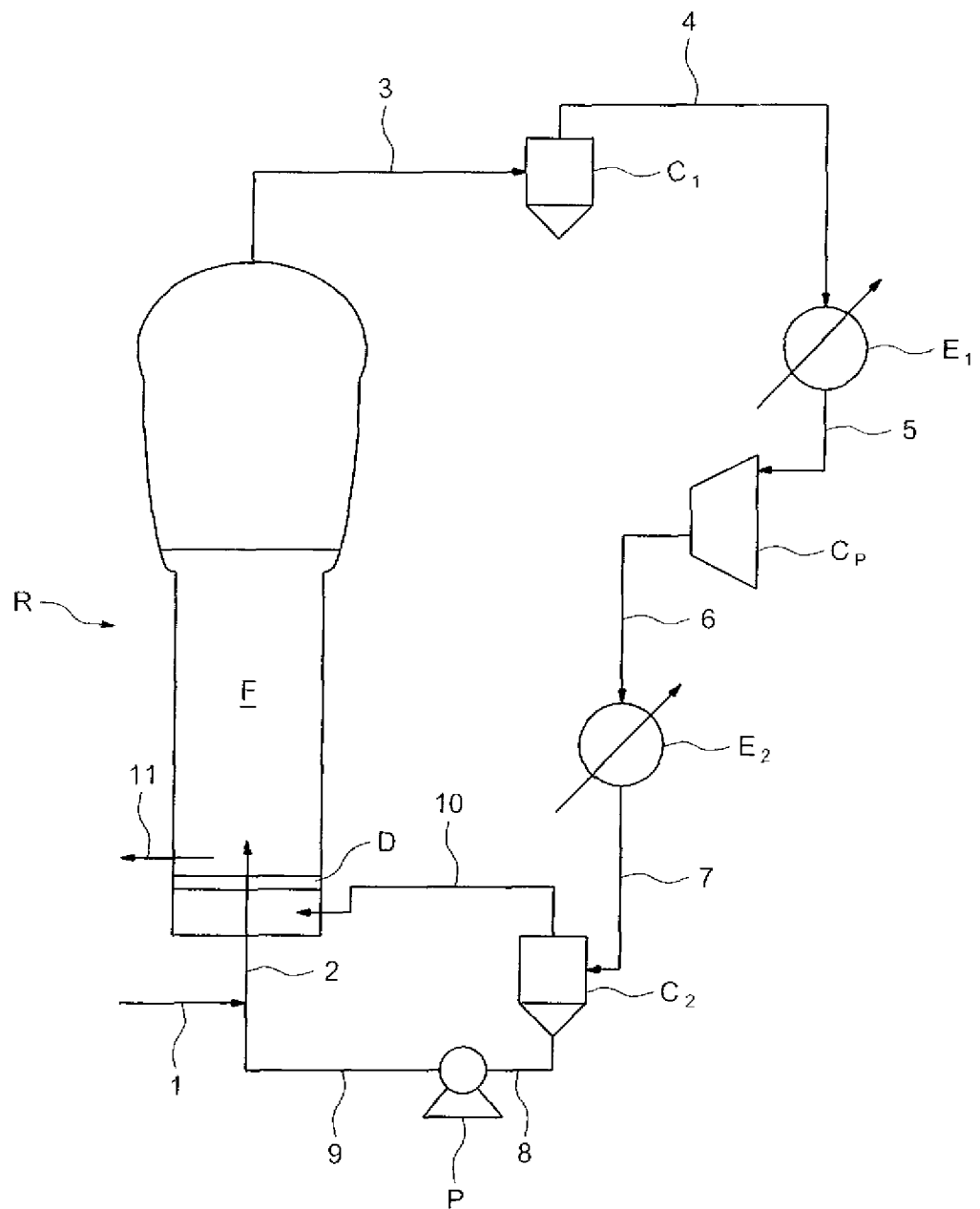

PRODUCTION OF GRAFTED POLYETHYLENE FROM RENEWABLE MATERIALS, THE OBTAINED POLYETHYLENE AND USES THEREOF

FIELD OF THE INVENTION

The present invention relates to a process for the manufacture of grafted polyethylene from renewable starting materials.

In particular, the invention relates to a process for the manufacture of grafted polyethylene from ethylene obtained by dehydration of alcohols resulting from the fermentation of renewable starting materials; preferably, the renewable starting materials are plant materials.

BACKGROUND OF THE INVENTION

The earliest polyolefin prepared industrially is polyethylene. Several types of polyethylene exist and are generally classified according to their density.

The high density polymer (HDPE, for High Density PolyEthylene), with a density generally of between 0.940 and 0.965 g/cm$^3$; this polyethylene is distinguished by a low degree of branching and consequently by strong intermolecular forces and by a high tensile strength. The low branching is provided by the choice of the catalyst and of the reaction conditions.

The medium density polymer (MDPE, for Medium Density PolyEthylene), with a density generally of between 0.925 and 0.940 g/cm$^3$; this polyethylene exhibits good impact properties.

The low density polymer (LDPE, for Low Density PolyEthylene), with a density generally of between 0.915 and 0.935 g/cm$^3$; this polymer exhibits a high degree of branching of chains (short and long). This polyethylene exhibits a low tensile strength and an increased ductility.

The linear low density polymer (LLDPE, for Linear Low Density PolyEthylene), with a density generally of between 0.915 and 0.935 g/cm$^3$; this polymer exists in a substantially linear form with a large number of short branches.

The very low density polymer (VLDPE, for Very Low Density PolyEthylene), with a density generally of between 0.860 and 0.910 g/cm$^3$; this polymer exists in a substantially linear form with a very large number of short branches.

In addition, there exists subcategories when the polyethylene is crosslinked or also according to its molecular weight.

Furthermore, the polyethylene is often used in combination with a second material other than polyethylene. It is possible to produce, for example, multilayer films comprising at least one layer of polyethylene and at least one other layer of this second material. Mention may be made, as example of second material, of polar polymers and also metals, alloys of metals or their oxides. Mention may be made, as polar polymer, of nitrogen-comprising and/or oxygen-comprising polymers, such as a polyamide, a saponified copolymer of ethylene and of vinylacetate or a polyester. However, these materials do not adhere or adhere only slightly to polyethylene. It is therefore necessary to use a layer of intermediate "tie" which adheres to the layers of polyethylene and to the second layer in order to be able to combine these 2 layers in the multilayer film. While polyethylenes of renewable origin have been described in the prior art, such as, for example, in the document US 2007/0219521, there currently exists no tie produced from renewable starting materials which makes it possible to combine a layer of polyethylene with a layer of a second material.

Advantageously and surprisingly, the inventors of the present patent application have employed a process for the industrial manufacture, from renewable starting materials, of a specific polyethylene which is a grafted polyethylene of use in tie manufacture.

The process according to the invention makes it possible to dispense, at least in part, with starting materials of fossil origin and to replace them with renewable starting materials.

In addition, the polyethylene obtained according to the process according to the invention is of such a quality that it can be used in any application in which it is known to use grafted polyethylene, including in the most demanding applications.

In particular, it makes it possible to manufacture a tie from renewable starting materials which makes it possible to combine a layer of polyethylene with a second material chosen from polar polymers and also metals, alloys of metals or their oxides.

SUMMARY OF THE INVENTION

A subject matter of the invention is a process for the manufacture of grafted polyethylene comprising the following stages:

a) fermentation of renewable starting materials and optionally purification, to produce at least one alcohol chosen from ethanol and mixtures of alcohols comprising ethanol;

b) dehydration of the alcohol obtained in order to produce, in a first reactor, at least one alkene chosen from ethylene and mixtures of alkenes comprising ethylene and optionally purification of the alkene in order to obtain ethylene;

c) polymerization, in a second reactor, of the ethylene to give polyethylene;

d) isolation of the polyethylene obtained on conclusion of stage c);

e) grafting of the polyethylene with at least one grafting monomer chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids.

Another subject matter of the invention is the polyethylene capable of being obtained by the process according to the invention or more generally the polyethylene grafted by the above grafting monomer, in which at least a portion of the carbon atoms is of renewable origin, it being possible for this portion of renewable origin to be determined according to the standard ASTM D 6866-06.

A further subject matter of the invention is the copolymers and the compositions comprising said polyethylene and also the uses of this polyethylene.

Other subject matters, aspects or characteristics of the invention will become apparent on reading the following description.

BRIEF DESCRIPTION OF THE DRAWINGS

FIG. 1 is a block diagram showing the polymerization process of the invention.

DETAILED DESCRIPTION OF THE INVENTION

Stage a) of the process for the manufacture of polyethylene according to the invention comprises the fermentation of renewable starting materials in order to produce at least one alcohol, said alcohol being chosen from ethanol and mixtures of alcohols comprising ethanol.

A renewable starting material is a natural resource, for example animal or plant, the stock of which can be reformed over a short period on the human scale. In particular, it is necessary for this stock to be able to be renewed as quickly as it is consumed. For example, plant materials exhibit the advantage of being able to be cultivated without their consumption resulting in an apparent reduction in natural resources.

Unlike the materials resulting from fossil materials, renewable starting materials comprise $^{14}C$. All the samples of carbon drawn from living organisms (animal or plant) are in fact a mixture of 3 isotopes: $^{12}C$ (representing approximately 98.892%), $^{13}C$ (approximately 1.108%) and $^{14}C$ (traces: $1.2 \times 10^{-10}$%). The $^{14}C/^{12}C$ ratio of living tissues is identical to that of the atmosphere. In the environment, $^{14}C$ exists in two predominant forms: in the form of carbon dioxide gas ($CO_2$) and in organic form, that is to say in the form of carbon incorporated in organic molecules.

In a living organism, the $^{14}C/^{12}C$ ratio is kept constant by metabolism because the carbon is continually exchanged with the external environment. As a proportion of $^{14}C$ in the atmosphere is constant, it is the same in the organism as long as it is alive, since it absorbs this $^{14}C$ in the same way as the ambient $^{12}C$. The mean $^{14}C/^{12}C$ ratio is equal to $1.2 \times 10^{-12}$.

$^{12}C$ is stable, that is to say that the number of $^{12}C$ atoms in a given sample is constant over time. $^{14}C$ is radioactive; the number of $^{14}C$ atoms in a sample decreases over time (t), its half life being equal to 5730 years.

The $^{14}C$ content is substantially constant from the extraction of the renewable starting materials up to the manufacture of the polyethylene according to the invention and even up to the end of the lifetime of the object manufactured in said polyethylene.

Consequently, the presence of $^{14}C$ in a material, whatever the amount thereof, is an indication with regard to the origin of the molecules constituting it, namely whether they originate from renewable starting materials and not from fossil materials.

The amount of $^{14}C$ in a material can be determined by one of the methods described in the standard ASTM D 6866-06 (Standard Test Methods for Determining the Biobased Content of Natural Range Materials Using Radiocarbon and Isotope Ratio Mass Spectrometry Analysis).

This standard comprises three methods of measuring the organic carbon resulting from renewable starting materials, referred to as "biobased carbon". The proportions indicated for the polyethylene of the invention are preferably measured according to the mass spectrometry method or the liquid scintillation spectrometry method described in the standard and very preferably by mass spectrometry.

These measurement methods evaluate the ratio of the $^{14}C/^{12}C$ isotopes in the sample and compare it with a ratio of the $^{14}C/^{12}C$ isotopes in a material of biological origin giving the 100% standard, in order to measure the percentage of organic carbon in the sample.

Preferably, the polyethylene according to the invention comprises an amount of carbon resulting from renewable starting materials of greater than 20% by weight, preferably of greater than 50% by weight, with respect to the total weight of carbon of the polyethylene.

In other words, the polyethylene can comprise at least $0.24 \times 10^{-10}$% by weight of $^{14}C$ and preferably at least $0.6 \times 10^{-10}$% by weight of $^{14}C$.

Advantageously, the amount of carbon resulting from renewable starting materials is greater than 75% by weight, preferably equal to 100% by weight, with respect to the total weight of carbon in the polyethylene.

Use may be made, as renewable starting materials, of plant materials, materials of animal origin or materials of plant or animal origin resulting from recovered materials (recycled materials).

Within the meaning of the invention, the materials of plant origin comprise at least sugars and/or starches.

The plant materials comprising sugars are essentially sugar cane and sugar beet; mention may also be made of maple, date palm, sugar palm, sorghum or American agave; the plant materials comprising starches are essentially cereals and legumes, such as corn, wheat, barley, sorghum, rice, potato, cassava or sweet potato, or algae.

Mention may in particular be made, among materials resulting from recovered materials, of plant or organic waste comprising sugars and/or starches.

Preferably, the renewable starting materials are plant materials.

The fermentation of the renewable materials takes place in the presence of one or more appropriate microorganisms; this microorganism may optionally have been modified naturally, by a chemical or physical stress, or genetically; the term used is then mutant. Conventionally, the microorganism used is *Saccharomyces cerevisiae* or one of its mutants.

Use may also be made, as renewable starting materials, of cellulose or hemicellulose, indeed even lignin, which can be converted to sugar-comprising materials in the presence of the appropriate microorganisms. These renewable materials include straw, wood or paper, which can advantageously originate from recovered materials.

The lists presented above are not limiting.

Preferably, the fermentation stage is followed by a purification stage intended to separate the ethanol from the other alcohols.

The alcohol or alcohols obtained are dehydrated in stage b) in order to produce, in a first reactor, at least one alkene chosen from ethylene and mixtures of alkenes comprising ethylene, the byproduct from the dehydration being water.

Generally, the dehydration is carried out using a catalyst based on alumina, preferably on γ-alumina, such as the catalyst sold by Eurosupport under the trade name ESM 110® (undoped trilobe alumina not comprising much residual $Na_2O$ (approximately 0.04%)).

The operating conditions for the dehydration form part of the general knowledge of a person skilled in the art; by way of indication, the dehydration is generally carried out at a temperature of the order of 400° C.

Another advantage of the process according to the invention is its saving in energy: the fermentation and dehydration stages of the process according to the invention are carried out at relatively low temperatures of less than 500° C., preferably of less than 400° C.; in comparison, the stage of cracking and steam cracking oil to give ethylene is carried out at a temperature of the order of 800° C.

This saving in energy is also accompanied by a decrease in the level of $CO_2$ emitted to the atmosphere.

Preferably, a purification stage is carried out during stage a) or during stage b).

The optional stages of purification (purification of the alcohol(s) obtained in stage a), purification of the alkene(s) obtained in stage b)) are advantageously carried out by absorption on conventional filters, such as molecular sieves, zeolites, carbon black, and the like).

If the alcohol obtained in stage a) was purified so as to isolate the ethanol, the alkene obtained in stage b) is ethylene.

If the alcohol obtained in stage a) was not purified, a mixture of alkenes comprising ethylene is obtained on conclusion of stage b).

Advantageously, at least one purification stage is carried out during stage a) and/or stage b) in order to obtain ethylene with a degree of purity sufficient to carry out a polymerization. It will be preferable to obtain ethylene with a degree of purity of greater than 85% by weight, preferably than 95% by weight, preferably than 99% by weight and very preferably than 99.9% by weight. Particularly preferably, the alcohol obtained in stage a) is purified so as to isolate the ethanol; consequently, the alkene obtained in stage b) is ethylene.

The main impurities present in the ethylene resulting from the dehydration of the ethanol are ethanol, propane and acetaldehyde.

Advantageously, the ethylene should be purified, that is to say that the ethanol, the propane and the acetaldehyde should be removed, in order to be able to easily polymerize in stage c).

The ethylene, the ethanol, the propane and the acetaldehyde can be separated by carrying out one or more low-temperature distillations.

The boiling points of these compounds are as follows:

| Compound | Boiling point (° C.) |
|---|---|
| Ethylene | −103.7 |
| Propane | −42.1 |
| Acetaldehyde | 20.8 |
| Ethanol | 75.5 |

The ethylene, the ethanol, the propane and the acetaldehyde are cooled to approximately −105° C., preferably −103.7° C., and then distilled in order to extract the ethylene.

Another advantage of the process according to the present invention relates to the impurities. The impurities present in the ethylene resulting from the dehydration of the ethanol are completely different from those present in the ethylene resulting from cracking or steam cracking. In particular, the impurities present in the ethylene resulting from cracking or steam cracking include dihydrogen and methane, this being the case whatever the composition of the initial feedstock.

Conventionally, dihydrogen and methane are separated after compressing to 36 bar and cooling to approximately −120° C. Under these conditions, the dihydrogen and the methane, which are liquids, are separated in the demethanizer and then the ethylene is recovered at 19 bar and −33° C.

The process according to the present patent application makes it possible to dispense with the stage of separation of the dihydrogen and methane and also makes it possible to cool the mixture to −105° C. at atmospheric pressure instead of −120° C. at 36 bar. The cooling of this separation stage can also take place under pressure in order to increase the boiling point of the compounds to be separated (for example approximately 20 bar and −35° C.). These differences also contribute to rendering the process according to the invention more economic (saving in equipment and saving in energy, which is also accompanied by a reduction in the level of $CO_2$ emitted to the atmosphere).

Another advantage is that the ethylene obtained in stage b) of the process according to the invention does not comprise acetylene, in contrast to the ethylene obtained by cracking or steam cracking. In point of fact, acetylene is highly reactive and brings about oligomerization side reactions; it is therefore particularly advantageous to obtain acetylene-free ethylene.

Another advantage is that the process according to the invention can be carried out in production units located on the site of production of the starting materials. In addition, the size of the production units of the process according to the invention is much smaller than the size of a refinery: specifically, refineries are large installations which are generally situated far from the centers of production of the starting materials and which are supplied via pipelines.

The stage c) of polymerization of the ethylene can be carried out in different ways according to the type of polyethylene which it is desired to synthesize.

Preferably, the polyethylene synthesized is LLDPE.

LLDPE can be synthesized according to two main methods: the solution method and the fluidized bed (gas phase) method.

The solution method can be carried out by introducing the ethylene into an autoclave reactor, indeed even into a tubular reactor, in the presence of at least one solvent and of at least one comonomer. The reactor can operate adiabatically or can be equipped with an external cooler.

The comonomer used is an α-olefin comprising from 3 to 10 carbon atoms and is more particularly chosen from olefins comprising 4, 6 or 8 carbon atoms; particularly preferably, the α-olefin is chosen from hex-1-ene, 2-methylpentene and oct-1-ene.

The catalyst used can be of Ziegler-Natta or metallocene type, indeed even, to a lesser extent, of Phillips type.

Ziegler-Natta catalysts are conventionally composed of a halogen derivative of a transition metal from Groups IV and V of the Periodic Table of the Elements (titanium, vanadium) and of an alkyl compound of a metal from Groups I to III.

Metallocene catalysts are single-site catalysts generally composed of one atom of a metal which can be zirconium or titanium and of two cycloalkyl molecules bonded to the metal; more specifically, metallocene catalysts are normally composed of 2 cyclopentadiene rings bonded to the metal. These catalysts are frequently used with aluminoxanes as cocatalysts or activators, preferably methylaluminoxane (MAO). Hafnium can also be used as metal to which cyclopentadiene is attached. Other metallocenes can include transition metals from Groups IVa, Va and VIa. Lanthanide metals can also be used.

The Phillips catalysts are obtained by deposition of chromium oxide on a support (silica or silica aluminum) with a high specific surface, of the order of 400 to 600 $m^2/g$. These catalysts are subsequently reduced and activated at very high temperature (400-800° C.).

The temperature of the reactor is generally between 150 and 300° C. and the pressure between 3 and 20 MPa.

At the reactor outlet, the gas enriched in monomer is returned to the inlet of the reactor and the liquid stream comprising the polyethylene is treated in order to separate the polyethylene from the solvent. The polyethylene is subsequently conveyed to an extruder.

According to the fluidized bed or gas phase method, the reaction medium is composed of catalyst particles around which the polyethylene is formed, of the ethylene and of the comonomers. The polyethylene produced is maintained in the solid phase, while the ethylene and the comonomers form the carrier gas of the fluidized bed. The injection of the ethylene and of the comonomers also makes it possible to remove the heat from the reaction and thus to control the polymerization temperature.

The comonomer used is an α-olefin comprising from 3 to 10 carbon atoms and is more particularly chosen from olefins comprising from 4 to 8 carbon atoms; particularly preferably, the α-olefin is chosen from but-1-ene and hex-1-ene, indeed even 2-methylpentene.

The catalyst used can be of Ziegler-Natta, metallocene or Phillips type.

The temperature of the reactor is generally between 80 and 105° C. and the pressure between 0.7 and 2 MPa.

This process is carried out in a vertical reactor. The ethylene is compressed to the required pressure and introduced at the inlet (bottom part) of the reactor. The control of the pressure of the ethylene at the reactor inlet makes it possible to control the reaction pressure. The catalyst and the optional cocatalyst, and the comonomer or comonomers, are introduced with the ethylene into the reactor.

At the reactor outlet, the gas mixture and the polyetheylene are extracted from the fluidized bed and then the pressure is reduced in order to separate the polyethylene from the gases. The constituents of the gas mixture (ethylene and the comonomers) are separated and optionally returned to the reactor. The polyethylene (solid) is purged, in order to remove the possible traces of ethylene, and conveyed to an extruder.

Low density (radical) polyethylene is produced by radical polymerization at a high pressure of the ethylene.

Two types of reactor are used for the synthesis of LDPE: autoclave (stirred) reactors and tubular reactors.

The reaction medium is composed of a solution of polymer and of monomer; the polymer obtained is isolated by successive reductions in pressure, taken up in the molten state by an extruder and then converted into granules.

High density polyethylene (HDPE) can be synthesized according to two main methods: the suspension polymerization method and the gas phase method.

These two methods can be carried out using a catalyst of Phillips type or a catalyst of Ziegler type, indeed even metallocene type.

Thus, in the suspension polymerization method in which a Phillips catalyst is employed, the reaction is carried out in suspension in a liquid hydrocarbon, generally isobutene; reference is made to particle-form process. The temperature of the medium is of the order of 100° C. and the pressure should be such that the medium remains liquid, that is to say approximately 3 MPa.

The suspension polymerization method in which a Ziegler catalyst is employed is carried out using a catalyst based on titanium tetrachloride in combination with an organometallic compound, for example alkylaluminum chloride; the reaction is carried out in suspension in a hydrocarbon of the hexane type. The temperature of the medium is slightly below 100° C. and the pressure is a few megapascals.

Generally, a comonomer, such as but-1-ene and hex-1-ene, is used to control the density of the polyethylene and hydrogen is used to control the molecular weight.

The use of metallocene catalysts makes it possible to manufacture particularly preferred polyethylenes, "metallocene polyethylenes" or "m-PEs".

In the case of the linear low density polymers, these are polyethylenes with a very narrow molecular distribution with short uniformly distributed branchings; they are then referred to as "m-LLDPEs".

Preferably, the polyethylene prepared in stage c) of the process according to the present patent application is metallocene linear low-density polyethylene, "m-LLDPE", prepared according to the fluidized bed method using a metallocene catalyst.

The polyethylene obtained in stage c) is subsequently isolated (stage d)). The polyethylene is then subsequently conveyed either to an extruder or directly to another reactor where it will be subjected to a grafting treatment.

The polyethylene isolated on conclusion of stage d) is subsequently grafted.

As described subsequently, the grafting of the polyethylene is carried out with at least one grafting monomer chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids.

The polymer is grafted with an unsaturated carboxylic acid. It would not be departing from the scope of the invention to use a functional derivative of this acid.

Examples of unsaturated carboxylic acids are those having from 2 to 20 carbon atoms, such as acrylic acid, methacrylic acid, maleic acid, fumaric acid and itaconic acid. The functional derivatives of these acids comprise, for example, the anhydrides, the ester derivatives, the amide derivatives, the imide derivatives and the metal salts (such as the alkali metal salts) of the unsaturated carboxylic acids.

Unsaturated dicarboxylic acids having from 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic or x-methylbicyclo[2.2.1]hept-5-ene-2,3-dicarboxylic acids or maleic, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,2-dicarboxylic anhydrides.

Examples of other grafting monomers comprise $C_1$-$C_8$ alkyl esters of unsaturated carboxylic acids or glycidyl ester derivatives of unsaturated carboxylic acids, such as methylacrylate, methyl methacrylate, ethyl acrylate, ethyl methacrylate, butyl acrylate, butyl methacrylate, glycidyl acrylate, glycidyl methacrylate, monoethyl maleate, diethyl maleate, monomethyl fumarate, dimethyl fumarate, monomethyl itaconate and diethyl itaconate; amide derivatives of unsaturated carboxylic acids, such as acrylamide, methacrylamide, maleic monoamide, maleic diamide, maleic N-monoethylamide, maleic N,N-diethylamide, maleic N-monobutylamide, maleic N,N-dibutylamide, fumaric monoamide, furamic diamide, fumaric N-monoethylamide, fumaric N,N-diethylamide, fumaric N-monobutylamide and fumaric N,N-dibutylamide; imide derivatives of unsaturated carboxylic acids, such as maleimide, N-butylmaleimide and N-phenylmaleimide; and metal salts of unsaturated carboxylic acids, such as sodium acrylate, sodium methacrylate, potassium acrylate and potassium methacrylate. Glycidyl methacrylate is preferred. More preferably still, maleic anhydride is preferred.

According to a specific alternative form, use may be made of maleic anhydride comprising carbon atoms of renewable origin.

The maleic anhydride can be obtained according to the process described in application FR 0854896 and internal application PCT/FR2009/051426 of the applicant company, which are incorporated by way of reference, one of the alternative manufacturing forms comprising the following stages:

a) fermentation of renewable starting materials and optionally purification in order to produce a mixture comprising at least butanol;

b) oxidation of the butanol to give maleic anhydride at a temperature generally of between 300 and 600° C. using a catalyst based on oxides of vanadium and/or of molybdenum;

c) isolation of the maleic anhydride obtained on conclusion of stage b).

The process for the manufacture of the maleic anhydride comprising carbon atoms of renewable origin is described in detail from page 2, line 21, to page 8, line 15, of international application PCT/FR2009/051426, which is included by way of reference in the present patent application.

One advantage of the use of the maleic anhydride resulting from renewable resources is that the amount of nonrenewable resources for manufacturing this polymer is further limited.

Furthermore, one advantage of this process is that the fermentation results in a more restricted number of isomers of the butanol than the chemical route of hydroformylation of propylene. The butanol obtained by fermentation of the renewable starting materials is particularly appropriate. In particular, butanol resulting from a fermentation of renewable starting materials exhibits a lower isobutanol/n-butanol ratio than purified butanol resulting from fossil starting materials, this being the case before even the optional stage of isolation of the n-butanol. Isobutanol and n-butanol exhibit very similar physicochemical properties, so that it is expensive to separate these products. The provision of n-butanol poor in isobutanol thus constitutes a major economic advantage for the process which is the subject matter of the invention since it makes it possible to produce a maleic anhydride of excellent quality at a lower cost.

Various known processes can be used to graft a grafting monomer to the polyethylene. The blend can comprise the additives normally used during the processing of polyolefins at contents of between 10 ppm and 5%, such as antioxidants, for example based on substituted phenol molecules, and the like, UV protecting agents, processing agents, such as, for example, fatty amides, stearic acid and its salts, fluoropolymers (known as agents for preventing extrusion defects), amine-based defogging agents, antiblocking agents, such as silica or talc, masterbatches with dyes, nucleating agents, and the like.

This can be carried out by heating the polymer at high temperature, from approximately 100° C. to approximately 300° C., in the presence or in the absence of a solvent, with or without radical generator.

Appropriate solvents or their mixtures which can be used in this reaction are benzene, toluene, xylene, chlorobenzene, cumene, and the like. Carbon dioxide in its liquid and/or supercritical state is also regarded as a solvent or cosolvent in this type of process.

Appropriate radical generators which can be used comprise peroxides, preferably peroxyesters, dialkyl peroxides, hydroperoxides or peroxyketals. These peroxides are sold by Arkema under the Luperox® trade mark. Mention may be made, as examples of peroxyesters, of t-butyl peroxy-2-ethylhexanoate (Luperox 26), t-butyl peroxyacetate (Luperox 7), t-amyl peroxyacetate (Luperox 555), t-butyl perbenzoate (Luperox P), t-amyl perbenzoate (Luperox TAP) and OO-t-butyl O-(2-ethylhexyl) monoperoxycarbonate (Luperox TBEC). Mention may be made, as dialkyl peroxides, of 2,5-dimethyl-2,5-di(t-butylperoxy)hexane (Luperox 101), dicumyl peroxide (Luperox DC), α,α'-bis(t-butylperoxy)diisopropylbenzene (Luperox F40), di(t-butyl)peroxide (Luperox DI), di(t-amyl) peroxide (Luperox DTA) and 2,5-dimethyl-2,5-di(t-butylperoxy)hex-3-yne (Luperox 130). An example of hydroperoxide is t-butyl hydroperoxide (Luperox TBH70). Use may be made, for example, as peroxyketal, of 1,1-di(t-butylperoxy)-3,3,5-trimethylcyclohexane (Luperox 231), ethyl 3,3-di(t-butylperoxy)butyrate (Luperox 233) or ethyl 3,3-di(t-amylperoxy)butyrate (Luperox 533).

The grafting reaction can then be carried out according to batch solution process or a continuous process with a melt blending device.

In the case of a batch solution grafting process, the polyethylene, dissolved in an appropriate solvent mentioned above, is brought to the reaction temperature in the presence of the monomer and of the radical generator, the reaction temperature and time being chosen to match the kinetics of decomposition of the radical generator, it being possible for the latter to be introduced continuously. Use is preferably made of a temperature ranging from 50 to 200° C. It is preferable to use the family of the peroxyesters as radical generator for the solution grafting. The treatment of the grafted polyethylene is carried out by precipitation from a nonsolvent for the latter.

The term "nonsolvent" is understood to mean an organic or nonorganic solvent or a mixture of organic or nonorganic solvents which does not make it possible to dissolve more than 10% of the grafted polymer. Mention may be made, by way of example, of water, ketones, alcohols, esters and their mixtures. Subsequent to the precipitation, the grafted polyethylene is obtained in the form of a powder or of agglomerates by filtration and drying. The grafted polyethylene can optionally be subjected to an additional "washing" stage by solid/liquid extraction between itself and a nonsolvent mentioned above.

In the case of a continuous grafting process, use is made of a device for extruding molten plastics known to a person skilled in the art. Mention may be made, by way of example, of internal mixers, open mills, single-screw or counterrotating or corotating twin-screw extruders, or continuous cokneaders. The grafting device can be one of the abovementioned devices or their combination, such as, for example, a cokneader in combination with a take-up single-screw, a corotating twin-screw in combination with a gear pump, and the like. In the case of an extrusion, the device is configured so as to identify a zone of melting of the polymer, a zone of blending and reaction between the entities present and a zone of pressure reduction/venting to remove the volatile compounds. These different zones can be given material form by the configuration of the screw of the device, the use of a restriction zone or the coupling together of devices. The device is also equipped with a filtration system and/or with a strand or underwater granulation system.

The polyethylene is introduced into the device, the temperature of the body of which is regulated, this temperature being chosen to match the kinetics of decomposition of the radical generator. It is preferable to use, as radical generator for the continuous grafting, the families of the dialkyl peroxides, of the hydroperoxides or of the peroxyketals. Use is preferably made of a temperature ranging from 100 to 300° C., more preferably from 180 to 250° C.

The polyethylene, the grafting monomer and the radical generator can be introduced simultaneously or separately into the extrusion device. In particular, the monomer and the radical generator can be introduced simultaneously with the polymer as main feed or separately by liquid injection along the device, together or separately from one another.

At the injection stage, the monomer and/or the radical generator can be combined with a fraction of a solvent, such as those mentioned above. The aim of this solvent fraction is to facilitate the blending between the reactive entities and also the removal of the volatile compounds during the venting stage.

At the pressure reduction/venting stage, a vacuum suited to the devolatilization of the volatile compounds and to the polyethylene is applied, it being possible for the level of vacuum to range from a few millibar to several hundred.

Finally, the grafted polyethylene is recovered and the outlet of the extrusion device in the form of granulate using a granulation device.

In the polymer modified by grafting obtained in the above-mentioned way, the amount of the grafting monomer can be chosen in an appropriate way but it is preferably from 0.01 to 10%, better still from 600 ppm to 50 000 ppm, with respect to the weight of grafted polymer.

According to one form of the invention, grafting is carried out on a blend of ungrafted polyethylene according to the invention and of another polymer, referred to as "cografting polymer". The blend is introduced into the extrusion device with a grafting monomer and a radical generator. The cografting polymer is different from the polyethylene according to the invention, that is to say that it does not have the same characteristics.

In particular, the cografting polymer can be a polyethylene; it is then a polyethylene with a density and/or a $^{14}C$ content different from that/those of the polyethylene according to the invention.

However, use may be made of any type of polymer as cografting polymer. Mention may be made, as examples of cografting polymer, of elastomers, homopolymers and copolymers of polyamide, polyester, polyvinyl, polyurethane or polystyrene type, such as styrene-based copolymers, for example SBRs (styrene/butadiene rubbers), styrene/butadiene/styrene block copolymers (SBSs), styrene/ethylene/butadiene/styrene block copolymers (SEBSs) and styrene/isoprene/styrene block copolymers (SISs). Mention may also be made of homopolymers and copolymers of polyolefin type such as, for example, homopolymers of ethylene and of propylene or their random or block copolymers, such as EPRs (ethylene/propylene rubbers, also denoted EPMs) and EPDMs (ethylene/propylene/dienes), ethylene/carboxylic acid vinyl ester copolymers, such as the ethylene/vinylacetate copolymer, ethylene/unsaturated (meth)acrylic acid ester copolymers or ethylene/unsaturated (meth)acrylic acid copolymers. Preferably, the cografting polymer is of polystyrene type or of polyolefin type.

The amount of the grafted monomer is determined by assaying the succinic functional groups by FTIR spectroscopy. The MFI or melt flow index of the grafted polymer is between 0.1 and 15 g/10 min (ASTM D 1238, 190° C., 2.16 kg), advantageously between 0.1 and 5 g/10 min, preferably between 0.1 and 3 g/10 min.

The present invention relates to the compositions comprising ungrafted polyethylene obtained from materials of renewable origin and the compositions comprising polyethylene obtained from materials of renewable origin, said polyethylene being grafted.

The present patent application is targeted more particularly at several families of compositions which may be of use as ties, in particular in coextrusion, comprising:
  a grafted polyethylene according to the invention, optionally diluted in an additional polymer,
  a cografted blend of at least one cografting polymer and of ungrafted polyethylene obtained according to stages a) to d) of the process according to the invention, optionally diluted in an additional polymer, said blend being cografted by at least one of the grafting monomers chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids.

These compositions, which comprise a polyethylene according to the invention, consequently comprise a polyethylene at least in part obtained from materials of renewable origin.

The additional polymer can be chosen from the cografting polymers; they can also be chosen from the grafted or ungrafted polyethylenes according to the invention.

It would not be departing from the scope of the invention for the additional polymer to be composed of a blend of polymers.

The present invention also relates to the uses of the grafted polyethylene obtained from materials of renewable origin and in particular to the uses as coextrusion tie, as impact modifier in polymers (that is to say, as adjuvant in a polymer which makes it possible to improve the impact strength of said polymer) or as compatibilizer for inorganic fillers (that is to say, an adjuvant which makes it possible to improve the compatibility with inorganic fillers).

More particularly, the present invention is targeted at a coextrusion tie comprising polyethylene obtained from materials of renewable origin, the use thereof in preparing a multilayer structure comprising such a coextrusion tie and the structure obtained.

Some embodiments of the ties according to the invention are described below.

A first type of tie composition comprises:
from 5 to 35% by weight of a polyethylene with a density of between 0.860 and 0.960, grafted by at least one of the grafting monomers described above;
from 5 to 95% by weight of ungrafted polyethylene,
from 0 to 60% of at least one modifier chosen from copolymers of ethylene with a monomer chosen from α-olefins, unsaturated carboxylic acid esters or saturated carboxylic acid vinylesters, or polymers having an elastomeric nature, the grafted polyethylene being at least partially obtained from materials of renewable origin. Advantageously, the tie will not comprise more than 5% by weight of grafting monomers.

The α-olefins which can be used as monomer are propylene, butene, hexene or octene.

The unsaturated carboxylic acid esters which can be used as monomer are alkyl (meth)acrylates, the alkyl of which has from 1 to 24 carbon atoms, such as, for example, methyl methacrylate, ethyl acrylate, n-butyl acrylate, isobutyl acrylate or 2-ethylhexyl acrylate.

The saturated carboxylic acid vinyl esters which can be used as monomer are vinylacetate or vinylpropionate.

The term "polymers having an elastomeric nature" according to the present patent application is understood to mean the polymers defined in the standard ASTM D412, that is to say a material which can be drawn at ambient temperature to twice its length, can be maintained thus for 5 minutes and can then, after having been released, return to its initial length to within less than 10%. The term "polymer having elastomeric nature" is also understood to mean a polymer not having exactly the above characteristics but which can be drawn and can return substantially to its initial length.

Mention may be made, by way of example of
  EPRs (ethylene/propylene rubbers, also denoted EPMs) and EPDMs (ethylene/propylene/dienes),
  styrene elastomers, such as SBRs (styrene/butadiene rubbers), styrene/butadiene/styrene block copolymers (SBSs), styrene/ethylene/butadiene/styrene block copolymers (SEBSs) and styrene/isoprene/styrene block copolymers (SISs).

This first type of tie composition includes those described in patent application EP 1 136 536 A1, except that the polyethylenes used in this patent application of the prior art are not obtained from materials of renewable origin.

More particularly, according to a first alternative form, the first type of coextrusion tie comprises the compositions (as described in EP 1 136 536 A1) comprising:

from 5 to 35 parts of a polymer (A) itself composed of a blend of 80 to 20 parts of a metallocene polyethylene (A1) with a density of between 0.865 and 0.965, advantageously between 0.865 and 0.94, and of 20 to 80 parts of a nonmetallocene LLDPE polyethylene (A2), the blend of (A1) and of (A2) being cografted by an unsaturated carboxylic acid as grafting monomer; and from 95 to 65 parts of a polyethylene (B) chosen from polyethylene homopolymers or copolymers and elastomers; the blend of (A) and (B) being such that:

the content of grafted unsaturated carboxylic acid is between 30 and $10^5$ ppm;

the MFI or melt flow index (standard ASTM D 1238, at 190° C. under 2.16 kg) is between 0.1 and 10 g/10 min;

except that, in the compositions according to the present patent application, at least one among the metallocene polyethylene (A1), nonmetallocene LLDPE polyethylene (A2) and polyethylene (B) is at least partially obtained from materials of renewable origin.

According to a second alternative form, the first type of coextrusion tie comprises the compositions (as described in EP 1 136 536 A1) composed:

of a blend of 80 to 20 parts of a metallocene polyethylene (A1) with a density of between 0.865 and 0.965, advantageously between 0.865 and 0.94, and of 20 to 80 parts of a nonmetallocene LLDPE polyethylene (A2), the blend of (A1) and of (A2) being cografted by an unsaturated carboxylic acid; the blend of (A1) and of (A2) being such that:

the content of grafted unsaturated carboxylic acid is between 30 and $10^5$ ppm;

the MFI or melt flow index (standard ASTM D 1238, at 190° C., under 2.16 kg) is between 0.1 and 10 g/10 min;

except that, in the compositions according to the present patent application, at least one among the metallocene polyethylene (A1) and nonmetallocene LLDPE polyethylene (A2) is at least partially obtained from materials of renewable origin.

The present patent application also relates to a multilayer structure comprising a layer comprising the coextrusion tie according to one of the two preceding alternative forms and, directly attached to this layer, a layer (E) of a nitrogen-comprising or oxygen-comprising polar resin, such as a polyamide resin, of aliphatic polyketone, of saponified copolymer of ethylene of vinyl (EVOH) or of polyester, or of a metal layer.

The layer (E) can also be at least partially obtained from materials of renewable origin.

Another subject matter of the invention is a rigid hollow body composed of a structure as described above.

A second type of tie composition comprises:

a blend comprising from 50 to 95% by weight of at least one polyethylene with a density of between 0.860 and 0.960, advantageously between 0.865 and 0.94, and from 5 to 50% by weight of at least one polymer other than polyethylenes, the blend being grafted by at least one of the grafting monomers described above;

optionally at least one ungrafted polyethylene with a density of between 0.860 and 0.965, optionally at least one modifier chosen from copolymers of ethylene with a monomer chosen from α-olefins, esters of unsaturated carboxylic acids or vinyl esters of saturated carboxylic acids, or polymers having an elastomeric nature, the grafted polyethylene and/or the ungrafted polyethylene being at least partially obtained from materials of renewable origin; advantageously, the tie will not comprise more than 5% by weight of grafting monomers.

This second type of tie composition includes those described in patent application EP 0 802 207 A1, except that the polyethylenes used in this patent application of the prior art are not obtained from materials of renewable origin.

More particularly, according to this second alternative form, the second type of composition comprises the compositions (as described in EP 0 802 207 A1) comprising:

at least (A) one polyethylene or one ethylene copolymer, at least (B) chosen from (B1) polypropylene or a propylene copolymer, (B2) poly(1-butene) homo- or copolymer and (B3) polystyrene homo- or copolymer, the blend of (A) and (B) being grafted by a functional monomer, this grafted blend being itself optionally diluted in at least one polyolefin (C) or in at least one polymer (D) having an elastomeric nature or in a blend of (C) and (D);

the polyethylene or ethylene copolymer (A) being at least partially obtained from materials of renewable origin.

The polyethylene or ethylene copolymer (A) can be LDPE, HDPE, LLDPE, VLDPE or m-PE.

The present patent application also relates to a multilayer structure composed of a layer comprising the coextrusion tie of the second type described above and, directly attached to this layer, a layer (E) of nitrogen-comprising or oxygen-comprising polar resin, such as a polyamide resin, of saponified copolymer of ethylene and of vinyl acetate, of a polyester resin, of an inorganic oxide deposited on a polymer, such as polyethylene, polyethylene terephthalate or EVOH, or else on a metal layer.

The layer (E) can also be at least partially obtained from materials of renewable origin.

Another subject matter of the invention is a protective film composed of the coextrusion tie of the second type.

A third type of tie comprises:

polyethylene with a density of between 0.860 and 0.965, advantageously between 0.865 and 0.94, grafted by at least one of the grafting monomers described above, and optionally ungrafted polyethylene, the grafted polyethylene and/or the ungrafted polyethylene being at least partially obtained from materials of renewable origin.

This third type of tie composition includes those described in patent application EP 1 400 566 A1, except that the polyethylenes used in this patent application of the prior art are not obtained from materials of renewable origin.

More particularly, this third type of coextrusion tie comprises:

from 10 to 35% by weight of a polymer (A) itself composed of a blend of 80 to 20% by weight of a metallocene polyethylene (A1) with a density of between 0.865 and 0.965, advantageously between 0.865 and 0.94, and of 20 to 80 parts of a nonmetallocene LLDPE polyethylene (A2), the blend of (A1) and of (A2) being cografted by a grafting monomer chosen from unsaturated carboxylic acids and their derivatives, the content of the grafting monomer in said blend being between 30 and 100 000 ppm;

from 40 to 60% by weight of a styrene/butadiene/styrene block copolymer (B) with from 50 to 90 mol % of styrene;

from 20 to 35% by weight of polyethylene (C), the total coming to 100%; the blend of (A), (B) and (C) being such that the MFI or melt flow index (standard ASTM D 1238, at 190° C., under 2.16 kg) is between 0.1 and 10 g/10 min;

at least one among the metallocene polyethylene (A1), nonmetallocene LLDPE polyethylene (A2) and polyethylene (C) being at least partially obtained from materials of renewable origin.

The present patent application also relates to a multilayer structure comprising a coextrusion tie of the third type described above and a layer (E) directly attached to one of the 2 faces of the layer (L), said layer (E) being a layer of polystyrene homo- or copolymer.

According to a preferred alternative form, this multilayer structure comprises a layer (F) directly attached to the second face of the layer (L), the layer (L) being positioned between the layers (E) and (F), said layer (F) being either a layer of polymer chosen from the group consisting of polyamides, aliphatic polyketones, saponified copolymers of ethylene and of vinylacetate (EVOH), polyethylenes, polyesters and polystyrenes, or a metal layer.

The layers (E) and/or (F) can also be at least partially obtained from materials of renewable origin.

EXAMPLE

An example of the implementation of the polymerization process is presented below. This implementation is represented diagrammatically in the appended FIGURE.

This implementation does not under any circumstances constitute a limitation on the polymerization stage of the process according to the present invention.

This implementation is carried out by means of the following device comprising a reactor R and a circuit for recycling the gases comprising two separators of cyclone type C1 and C2, two heat exchangers E1 and E2, a compressor Cp and a pump P.

The reactor R comprises a distributing plate (or distributor) D which delimits a lower zone which is a zone of admission of the gases and liquids and an upper zone F where the fluidized bed is situated.

The distributor D is a plate in which holes are inserted; this distributor is intended to render uniform the throughput of the gases entering the reactor.

According to this implementation, a measure of ethylene and of comonomer (1-hexene) is introduced via the pipe 1 and then via the pipe 2 into the reactor where the polymerization in a fluidized bed is carried out.

The fluidized bed comprises the catalyst and preformed particles of polymers; this bed is kept in a fluidized state by means of a rising stream of gas originating from the distributor D. The volume of the fluidized bed is kept constant by withdrawing the polyethylene formed using the discharge pipe 11.

The polymerization of ethylene is an exothermic reaction; the temperature inside the reactor is kept constant by controlling the temperature of the gas (recycled) introduced into the reactor via the pipe 10.

The gas comprising the unreacted molecules of ethylene and of 1-hexene and a transfer agent (hydrogen) exits from the reactor and enters the recycling circuit via the pipe 3. This gas is treated in the separator of cyclone type C1 in order to remove the possible fine polyethylene particles which might have been entrained. The treated gas is subsequently introduced via the pipe 4 into a first heat exchanger E1 where it is cooled. The gas exits from the heat exchanger E1 via the pipe 5 and enters a compressor Cp, and the fluid emerges via the pipe 6. The fluid is cooled in a second heat exchanger E2 so as to condense the comonomers. The pipe 7 conveys the fluid from the exchanger E2 to the separator of cyclone type C2. The gases are separated from the liquids in the separator of cyclone type C2: the liquids exit from the separator of cyclone C2 via the pipe 10 and are introduced into the reactor R and the gases exit from the separator of cyclone type C2 via the pipe 8, enter the pump P and then are introduced via the pipe 9 and then via the pipe 2 into the reactor.

Polyethylene was prepared from ethylene obtained by carrying out stages a) and b) according to the process of the present application.

3 tests were carried out on this device with 3 fluids, the compositions of which at the reactor inlet are as follows:

|  | Test No. 1 | Test No. 2 | Test No. 3 |
|---|---|---|---|
| Ethylene (mol %) | 70.0 | 69.9 | 66.1 |
| 1-hexene (mol %) | 1.02 | 1.01 | 1.02 |
| Nitrogen (mol %) | 28.98 | 29.09 | 32.88 |
| Hydrogen (ppm) | 500 | 550 | 170 |

The reaction was carried out under the following operating conditions:
Pressure in the reactor: 25 bar
Temperature in the reactor: 90° C.
Velocity of the gas: 0.6 m/s
Height of the fluidized bed: 15 m
Temperature of the fluids
at the inlet of the reactor: 40° C.
Output: 125 kg/m$^3$/h.

The polyethylenes obtained exhibit the following properties:

|  | Test No. 1 | Test No. 2 | Test No. 3 |
|---|---|---|---|
| Flow index (g/10 min) | 1.11 | 3.39 | 0.11 |
| Density (g/cm$^3$) | 0.9162 | 0.9175 | 0.9115 |

The flow index is measured according to the standard ASTM D 1238 (190° C.; 2.16 kg). The density is measured according to the standard ASTM D 1505.

The polyethylenes obtained are subsequently grafted by reactive extrusion: the polyethylene is introduced into an extruder, the extrusion temperature being 200° C. A mixture (50%/50% by weight) of maleic anhydride and a dialkyl peroxide is injected at one point of the extruder and the throughputs by weight are adjusted such that the polyethylene throughput is 100 times greater than that of the peroxide/anhydride mixture. The grafted polymer is recovered at the extruder outlet.

What is claimed is:
1. A process for the manufacture of grafted polyethylene, comprising the following stages:
   a) fermenting one or more renewable starting materials optionally including purification, to produce ethanol or mixtures of alcohols comprising ethanol;
   b) dehydrating said alcohol(s) obtained in order to produce, in a first reactor, ethylene or mixtures of alkenes comprising ethylene optionally including purification of the alkene in order to obtain ethylene;

c) polymerizing, in a second reactor, said ethylene to give polyethylene;
d) isolating said polyethylene obtained on conclusion of stage c);
e) grafting of the polyethylene with at least one grafting monomer chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids,
wherein a purification stage is carried out during stage b), wherein the purification stage comprises the removal of ethanol, propane and acetaldehyde and wherein the purification stage results in a degree of purity greater than 99%,
wherein the purification stage comprises cooling at least to a temperature of −103.7° C. and distilling.

2. The process for the manufacture of polyethylene as claimed in claim 1, wherein the renewable starting materials are plant materials chosen from sugar cane and sugar beet, maple, date palm, sugar palm, sorghum, American agave, corn, wheat, barley, rice, potato, cassava, sweet potato or algae.

3. The process for the manufacture of polyethylene as claimed in claim 1, in which the grafting monomer is maleic anhydride.

4. The process for the manufacture of polyethylene as claimed in claim 3, in which the maleic anhydride is obtained from renewable starting materials.

5. The process for the manufacture of polyethylene as claimed in claim 1, wherein the polyethylene prepared in stage c) is metallocene linear low-density polyethylene, (m-LLDPE), prepared according to a solution method using a metallocene catalyst.

6. The process for the manufacture of polyethylene as claimed in claim 1, wherein the distillation is at atmospheric pressure.

7. The process for the manufacture of polyethylene as claimed in claim 1, wherein the purification stage results in a degree of purity greater than 99.9%.

8. A process for the manufacture of grafted polyethylene, comprising the following stages:
a) fermenting one or more renewable starting materials optionally including purification, to produce ethanol or mixtures of alcohols comprising ethanol;
b) dehydrating said alcohol(s) obtained in order to produce, in a first reactor, ethylene or mixtures of alkenes comprising ethylene optionally including purification of the alkene in order to obtain ethylene;
c) polymerizing, in a second reactor, according to a solution method using a metallocene catalyst, said ethylene to give polyethylene;
d) isolating said polyethylene obtained on conclusion of stage c);
e) grafting of the polyethylene with at least one grafting monomer chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids,
wherein a purification stage is carried out during stage b), wherein the purification stage comprises the removal of ethanol, propane and acetaldehyde,
wherein the purification stage comprises cooling at least to a temperature of −103.7° C. and distilling.

9. The process for the manufacture of polyethylene as claimed in claim 8, wherein the purification stage results in a degree of purity greater than 99%.

10. A process comprising the following stages:
a) fermenting one or more renewable starting materials optionally including purification, to produce ethanol or mixtures of alcohols comprising ethanol;
b) dehydrating said alcohol(s) obtained in order to produce, in a first reactor, ethylene or mixtures of alkenes comprising ethylene optionally including purification of the alkene in order to obtain ethylene, further including a purification stage wherein the purification stage comprises the removal of ethanol, propane and acetaldehyde;
c) polymerizing, in a second reactor, said ethylene to give polyethylene;
d) isolating said polyethylene obtained on conclusion of stage c);
e) grafting of the polyethylene with at least one grafting monomer chosen from unsaturated carboxylic acids or their functional derivatives, unsaturated dicarboxylic acids having from 4 to 10 carbon atoms and their functional derivatives, $C_1$-$C_8$ alkyl esters of unsaturated carboxylic acids or glycidyl ester derivatives of unsaturated carboxylic acids, or metal salts of unsaturated carboxylic acids to obtain a grafted polyethylene;
f) forming a coextrusion tie layer with said grafted polyethylene,
wherein the purification stage comprises cooling at least to a temperature of −103.7° C. and distilling.

11. The process for the manufacture of polyethylene as claimed in claim 10, wherein the purification stage results in a degree of purity greater than 99%.

12. The process as claimed in claim 10, wherein step (f) comprises diluting the grafted polyethylene with an additional polymer.

13. The process as claimed in claim 10, the process further comprising forming a multilayer structure with the coextrusion tie as an intermediate layer.

14. The process as claimed in claim 10, wherein the grafted copolymer comprises an amount of carbon resulting from renewable starting materials of greater than 20% by weight with respect to the total weight of carbon of the polyethylene.

15. The process as claimed in claim 10, wherein the grafted copolymer comprises an amount of carbon resulting from renewable starting materials of greater than 50% by weight with respect to the total weight of carbon of the grafted polyethylene.

* * * * *